United States Patent [19]
Hirai

[11] Patent Number: 5,409,662
[45] Date of Patent: Apr. 25, 1995

[54] METHOD AND APPARATUS FOR EXTRUDING POWDER MATERIAL

[75] Inventor: Yoshiki Hirai, Tokyo, Japan

[73] Assignee: Hitachi Powdered Metals Co., Ltd., Chiba, Japan

[21] Appl. No.: 13,406

[22] Filed: Feb. 4, 1993

[30] Foreign Application Priority Data

Feb. 8, 1992 [JP] Japan ................... 4-056689

[51] Int. Cl.$^6$ ............................ B22F 3/02; B22F 5/08
[52] U.S. Cl. ...................... 419/67; 419/66; 29/893; 29/893.34
[58] Field of Search ................ 419/66, 67; 148/513; 29/893, 893.34

[56] References Cited

U.S. PATENT DOCUMENTS

| | | | |
|---|---|---|---|
| 3,559,271 | 2/1971 | Nilsson | 29/420.5 |
| 3,677,672 | 7/1972 | Harrington | 425/78 |
| 3,694,127 | 9/1972 | Takahashi et al. | 425/352 |
| 3,757,410 | 9/1973 | Roberts | 29/420.5 |
| 3,842,646 | 10/1974 | Kuhn | 72/354 |
| 3,891,367 | 6/1975 | Signora | 425/78 |
| 3,910,091 | 10/1975 | Samanta | 72/256 |
| 4,111,031 | 9/1978 | Vennemeyer et al. | 72/359 |
| 5,156,854 | 10/1992 | Yamada | 425/78 |
| 5,201,966 | 4/1993 | Hirai | 148/514 |

FOREIGN PATENT DOCUMENTS

| | | |
|---|---|---|
| 0022433 | 1/1981 | European Pat. Off. |
| 592792 | 2/1934 | Germany . |
| 733802 | 4/1943 | Germany . |
| 752704 | 2/1953 | Germany . |
| 1758540 | 3/1972 | Germany . |
| 2002684 | 12/1973 | Germany . |
| 1420318 | 1/1976 | United Kingdom . |
| 2022001 | 12/1979 | United Kingdom . |
| 2150069 | 6/1985 | United Kingdom . |
| 2229450 | 9/1990 | United Kingdom . |
| 9006199 | 6/1990 | WIPO . |

OTHER PUBLICATIONS

German Office Action of Jun. 3, 1993 and English Language translation.
Magazine article, *technica*, 21/1979, p. 1745.
United Kingdom Search Report.

Primary Examiner—Donald P. Walsh
Assistant Examiner—John N. Greaves
Attorney, Agent, or Firm—Sandler, Greenblum & Bernstein

[57] ABSTRACT

Disclosed is a method and an apparatus for extruding a powder material to form a pellet. The method includes the steps of: preparing a semicompacted powdered material for temporary placement in a die cavity with a constricting passage for receiving a charge of the powdered material; charging the die cavity containing the semicompacted powdered material with a predetermined amount of the powdered material; and pressing the charged powder material into the die cavity against the semicompacted material and extruding the semicompacted material from the die cavity through the constricting passage, whereby the semicompacted material is completely compressed to form a pellet, and the charged powdered material is incompletely compressed into a semicompacted form. The charging and pressing steps are repeated to successively form the powdered material into pellets via the semicompacted material.

In the apparatus, a longitudinal die cavity passes through a die, and includes a first passage and a constricting passage subsequently connecting to the first passage, in which the lateral sectional dimension of the first passage is substantially uniform and the lateral sectional dimension of the constricting passage is gradually reduced. A punch is movable relative to the die in the longitudinal direction of the die cavity for slidable insertion into the die cavity, and regulated so that, when the punch is inserted into the die cavity, the punch does not substantially reach the constricting passage.

12 Claims, 5 Drawing Sheets

METHOD AND APPARATUS FOR EXTRUDING POWDER MATERIAL

BACKGROUND OF THE INVENTION

1. Field of the Invention

The present invention relates to a method and an apparatus for extruding a powdered material to form a pellet.

2. Description of the Prior Art

In the field of powder metallurgy, a powdered material is pressed into a pellet with a desired shape before sintering, and a compression molding method is popularly used for compacting the powdered material. In this method, a powdered material is poured into a molding cavity and compressed by a punch applied to the cavity. However, if an elongated pellet is desired and the molding cavity has thus a large longitudinal depth in comparison with the area of the surface pressed by the punch, it is difficult to uniformly press the whole of the powdered material in the molding cavity. As a result, the use of this method is limited only for manufacturing a pellet which has a small length relative to the area of the pressed surface. Therefore, when a longitudinal pellet is the goods, an extrusion method has been conventionally used.

In the conventional extrusion method, the powdered material is ordinarily mixed with a binder such as a wax and the like for imparting moldability to the powdered material, and converted into a paste. Then, the obtained paste is filled into a container of an extruder in which the extrusion operation is performed in a manner similar to that of an injection molding machine, and the paste is extruded from the container through a cavity to form an extrudate, which is sintered thereafter to obtain a sintered product. In most cases, it is, however, required to subject the extrudate to a aftertreatment to remove the binder from the extrudate.

Moreover, in a case of employing a hot extrusion technique, the kind of raw powdered material and the operating temperature must be carefully selected so that oxidation of the powdered material can be avoided. However, if such a temperature selection is difficult and the use of a material which is expected to be oxidized at a high temperature is unavoidable, an encapsulation method must be employed. In the encapsulation method, the raw material is enclosed in a sheath under vacuum, and is then subjected to hot extrusion. The above treatment prevents the raw material from being oxidized. However, except for some special cases, the extrudate should be further treated to remove the sheath by chemical dissolution, etc.

As described above, for implementing the conventional extrusion method, a variety of additional and complicated steps, i.e. the paste-forming step, the wax-removing step, etc. are necessary before or after the essential extrusion process. Accordingly, the conventional extrusion method, particularly a hot extrusion method, has an adverse effect on the manufacturing cost. Therefore, at present, the technical field in which the extrusion method can be employed is limited to only special cases in which the manufactured pellet has a high value added for economic reasons and in which the pellet manufactured by using the extrusion method can be imparted a particular property that cannot be obtained by the ordinary powder metallurgical method. Consequently, the extrusion method has not been generally utilized for manufacturing ordinary machine parts, in spite of prominent characteristics latent in that method.

SUMMARY OF THE INVENTION

It is therefore an object of the present invention to provide an extrusion method and an extruding apparatus for easily and successively extruding a powdered material which is usually used in the ordinary powder metallurgical method or in a compression molding method.

In order to achieve the above-mentioned objects, a method of extruding a powdered material into a pellet according to the present invention comprises the steps of: (A) preparing a semicompacted powdered material for temporary placement in a die cavity with a constricting passage for receiving a charge of the powdered material; (B) charging the die cavity containing the semicompacted powdered material with a predetermined amount of the powdered material; (C) pressing the charged powder material into the die cavity against the semicompacted material and extruding the semicompacted material from the die cavity through the constricting passage, whereby the semicompacted material is completely compressed to form a pellet, and the charged powdered material is incompletely compressed into a semicompacted form; and (D) repeating the steps (B) and (C) to successively form the powdered material into pellets via the semicompacted material.

Moreover, an apparatus for successively extruding a powdered material into a pellet according to the present invention comprises: a die which has a longitudinal die cavity passing through the die and including a first passage and a constricting passage subsequently connected to the first passage, in which the lateral sectional dimension of the first passage is substantially uniform and the lateral sectional dimension of the constricting passage is gradually reduced; and a punch being movable relative to the die in the longitudinal direction of the die cavity for slidable insertion into the die cavity, the punch being regulated so that, when the punch is inserted into the die cavity, the punch does not substantially reach the constricting passage.

As a result of the above configuration, the manufacturing cost for extrusion of the powdered material can be reduced, and it becomes possible to widely apply the extrusion method to the manufacture of various machine parts.

BRIEF DESCRIPTION OF THE DRAWINGS

The features and advantages of the extrusion method and extruding apparatus according to the present invention will be more clearly understood from the following description of the preferred embodiments of the present invention taken in conjunction with the accompanying drawings in which identical reference numerals designate the same or similar elements or sections throughout the figures thereof and in which.

DETAILED DESCRIPTION OF THE PREFERRED EMBODIMENTS

Figure 1:
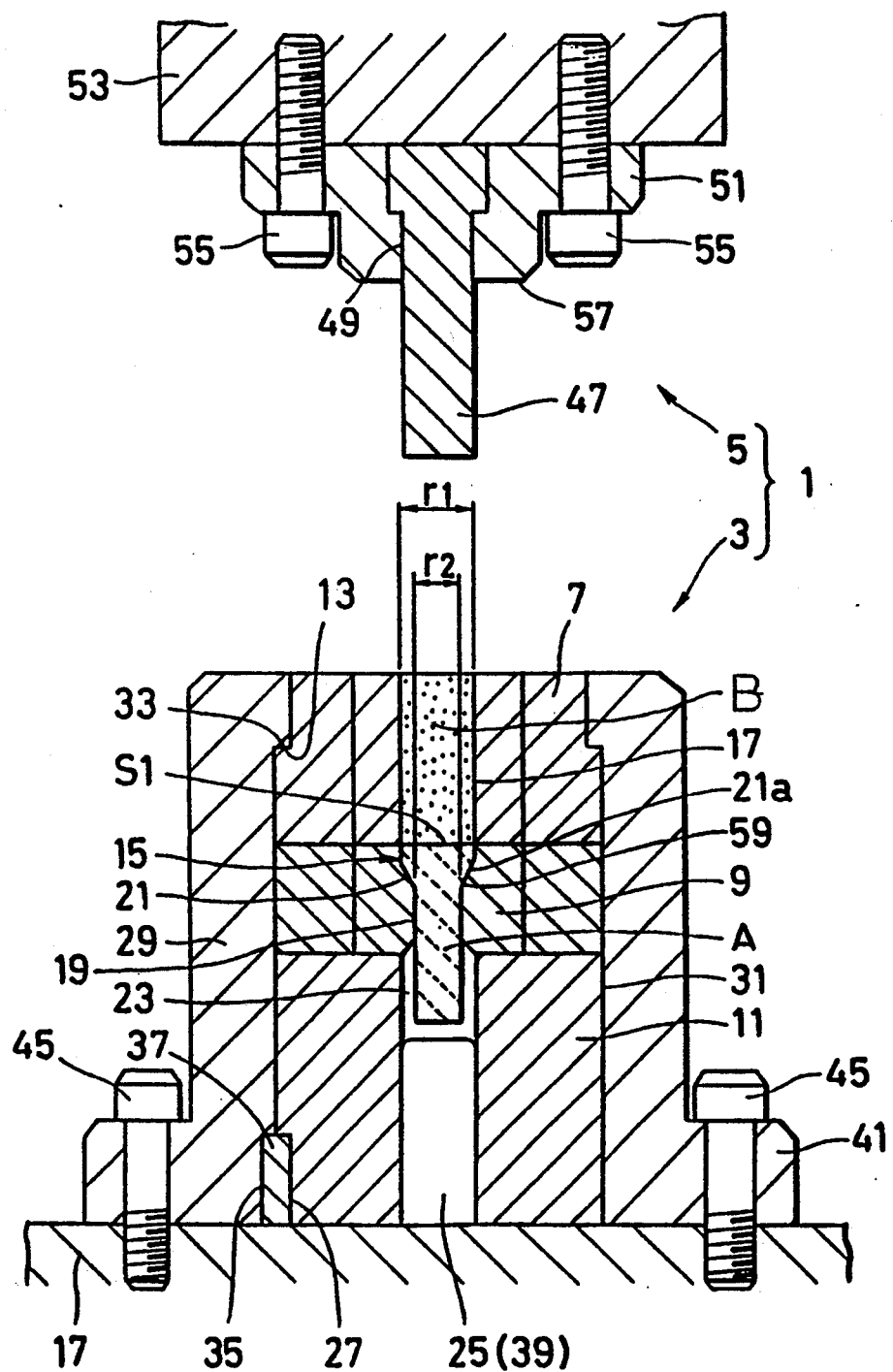
FIG. 1 is a vertical sectional view showing a first embodiment of the extrusion apparatus according to the present invention.

Usually, an extrusion method is applied to a moldable material with a low flowability, such as plastic, metal, paste and the like. It is difficult to apply the ordinary extrusion methods to a highly flowable material such as powder, liquid and the like to pass the material through a die cavity, because this material easily falls out of the die cavity due to its flowability, when the powdered material is charged into the die cavity. Therefore, it has seemed rather difficult to form a powdered material into a pellet by using the extrusion method without a binding agent. However, as a result of intensive research, a successful extrusion method using no binder according to the present invention has been developed by the inventor of the present application. In the extrusion method of the present invention, no binding material is required for shaping the powdered material, and the pellet can be successively manufactured. Specifically, the extrusion method for a powdered material according to the present invention comprises the steps of: placing a semicompacted powder material in the die cavity for temporarily receiving the powdered material into the die cavity; charging the die cavity with a predetermined amount of the powdered material; and pressing the charged powdered material into the die cavity against the semicompacted material and extruding the semicompacted material out of the die cavity through the constricting passage, whereby the semicompacted material is completely compressed to form a complete pellet, and the powdered material is incompletely compressed into a semicompacted form.

Namely, in the present invention, a portion of the powdered material is not formed directly as a completely compacted product, but is first half compressed into a semicompacted form and held in the die cavity. This semicompacted material is used for receiving the next portion of the powdered material to be compressed. This next portion of the powdered material charged into the die is then pressed against the semicompacted material, and formed into the next semicompacted portion replacing the former semicompacted portion. At the same time, the former semicompacted portion is extruded from the die cavity and formed into a completely compacted product. According to the above-described steps, it becomes possible to extrude a powdered material without a binding agent. Moreover, it is also possible to successively manufacture the pellets by repeating the operation of charging a raw powdered material and pressing the charged powdered material with the semicompacted portion.

Referring now to the drawings, preferred embodiments of the extrusion method for a powdered material and the extruding apparatus for accomplishing the extrusion method according to the present invention will be explained.

Figure 2:
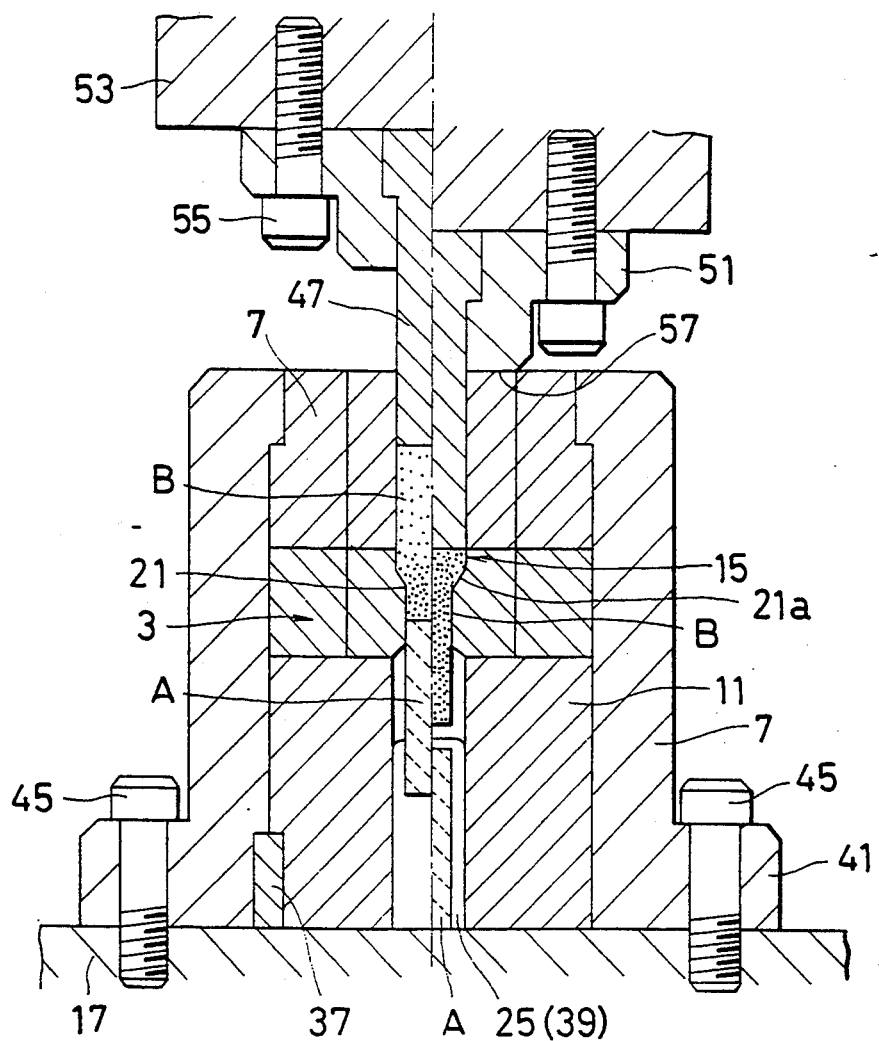
FIG. 2 is a vertical sectional view of the left and right portions for explaining the operation of the apparatus of FIG. 1.

FIGS. 1 and 2 show a first embodiment of the apparatus for accomplishing the extrusion method according to the present invention.

Referring to FIG. 1, an extrusion apparatus 1 comprises a die assembly 3 and a punch assembly 5.

The die assembly 3 includes a container 7, a die 9 and a die block 11 each of which is formed into a cylindrical shape of the same diameter, and coaxially arranged so that the die 9 is disposed below the container 7 and the die block 11 supports the die 9 and the container 7. The outer peripheral top portion of the container 7 is formed into a step portion 13 at which the diameter is reduced.

Along the central axis of the container 7 and the die 9, a die cavity 15 is formed so that it axially penetrates the container 7 and the die 9. The die cavity 15 includes three sections, namely, first and second cylindrical passages 17 and 19 and a constricting passage 21 interposed between the first and second cylindrical passages 17 and 19. The first passage 17 vertically passes through the container 7 and extends to the inside of the die 9. The diameter r1 of the first passage 17 is larger than the diameter r2 of the second passage 19, and the two passages 17, 19 are coaxially connected via the constricting passage 21. The constricting passage 21 is formed into a truncated-cone shape, thereby the die cavity 15 is tapered at the constricting passage 21, namely, the cross-sectional dimension of the die cavity is gradually reduced at the constricting passage to a size that is approximately as large as the cross-sectional dimension of a desired compacted product. At the lower end portion of the die 9, the second passage 19 is enlarged and connected to a cylindrical accommodation chamber 23 which is axially penetrates the die block 11. At the lower portion of the die block 11, an aperture 25 is provided to laterally communicate the accommodation chamber and outside of the die block 11. Moreover, a positioning recess 27 is provided on the lower and outer peripheral portion of the die block 11.

The die assembly 3 further includes a die holder 29 with a cylindrical inner bore 31 in which the container 7, the die 9 and the die block are slidably fitted and coaxially received. At the top of the die holder 29, a rim portion 33 which protrudes radially and inwardly is integrally provided for receiving the step portion 13 of the container 7, when the container 7 is inserted into the die holder 29. Moreover, a positioning recess 35 is formed on the lower end portion of the inner bore 31 of the die holder 29. With aligning this positioning recess 35 with the positioning recess 27 of the die block 11, a lock pin 37 is inserted and engaged with the recesses 27 and 35 so that the die block 11 is positioned and secured to the die holder 29. In addition, a side opening 39 is provided on the lower portion of the die holder 29 so that the side opening 39 meets the aperture 25 of the die block 11 when the die block 11 is positioned by the lock pin 37. Furthermore, a flange 41 is integrally formed on the outer periphery of the lower end portion of the die holder 29 for fixedly mounting the die assembly 3 on a lower hard plate 43 of the extruding apparatus 1.

In assembling the die assembly 3, initially, the container 7, the die 9 and the die block 11 are inserted into the die holder 29 from the bottom of the die holder 29 in order. At this time, the step portion 13 of the container 7 is received by the rim portion 33 of the die holder 29, and the top surface of the container 7 is made level with the top surface of the die holder 29. Next, the aperture 25 of the die block 11 is adjusted to the side opening 39 of the die holder 29, and the lock pin 37 is inserted into the positioning recesses 27 and 35 to secure the die block 11 to the die holder 29. Then, the die holder 29 with the above inserted components is mounted on the lower hard plate 43 of the extruding apparatus 1, and secured thereto with bolts 45.

On the other hand, the punch assembly 5 comprises a punch 47 with a diameter approximately the same as that of the first passage 17 of the die cavity 15 so that the punch 47 can be fitted into the first passage 17. However, the diameter of the upper base portion of the punch 47 is slightly enlarged. The punch 47 passes through a hole 49 of a stopper ring 51, and the stopper ring 51 is secured to an upper hard plate 53 with bolts 55 in such a manner that the punch 47 firmly stands on the upper hard plate 53. The upper hard plate 53 is connected to a drive source such as hydraulic press and the like so that the upper hard plate 53 can be vertically raised and lowered. The punch assembly 5 is controlled so that, when the punch assembly 5 is elevated to a preset highest position, the position of the punch assembly 5 can be maintained for a predetermined time. Moreover, operation of the punch assembly 5 is regulated so that the lowest position of the punch 47 is adjusted to coincide with a position at which the lower surface 57 of the stopper ring 51 abuts the top surface of the container 7, as shown in the right half portion of FIG. 2. At this time, the length of the punch 47 is regulated so that is does not reach the constricting passage 21.

Figure 3:
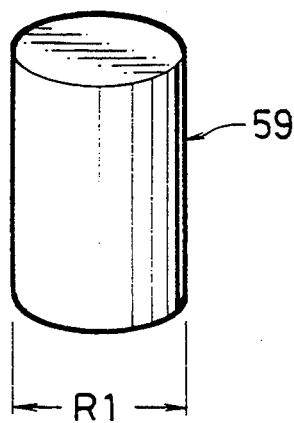
FIG. 3 is a perspective view of a pellet manufactured by the apparatus of FIG. 1.

Next, referring to FIGS. 1 and 2, the operation of the extruding apparatus 1, in which a cylindrical pellet 59 as shown in FIG. 3 is formed, will be described below.

First, a preparatory step is carried out for preparing and placing a semicompacted portion of the powdered material into the die cavity 15 so that the powdered material to be charged in the die cavity 15 can be received and temporarily supported by the semicompacted portion, as shown in FIG. 1.

This step is characterized in that a temporary foundation is initially placed in the die cavity 15. In FIG. 1, the portion A corresponds to the temporary foundation of this step. Any deformable or flexible material can be utilized as a material for the temporary foundation. For example, a soft solid piece made of a soft metal such as lead and the like; an elastic rubber; a cellular material such as polyurethane foam, sponge and the like, a flexibly sheeted material such as paper, cloth and the like; and a fibrous filler such as glass fiber, cotton fiber and the like can be utilized. The flexible material as mentioned above is placed in the constricting passage 21 of the die cavity 15 so as to close the die cavity 15 in the vicinity of the constricting passage 21, and more preferably, a soft solid such as lead is utilized to sufficiently fill the constricting passage 21. Another example of the material for the temporary foundation is a powder pellet which is compressed into a cylindrical shape with the same diameter as that of the second passage 19. In this case, the powder pellet is fittedly inserted in the second passage 19 to close the die cavity 15.

After positioning the temporary foundation, the die cavity 15 is charged with a predetermined amount of the powder material, which corresponds to the portion B of FIG. 1, and the charged powder material is pressed by the punch 47 into the die cavity 15 against the temporary foundation A, as shown in the left half portion of FIG. 2. By this operation, the temporary foundation A is extruded from the die cavity 15 through the constricting passage 21 and the second passage 19 to enter the accommodation chamber 23, as shown in the right half portion of FIG. 2. At the same time, the powdered material is pressed into the constricting passage and the second passage 19. At this time, the pressure vertically applied to the powder material by the punch 47 produces a reaction force on the inclined surface 21a of the constricting passage 21, and the powdered material in the vicinity of the inclined surface 21a is radially pushed toward the central axis of the die cavity 15, while the powdered material is pushed down into the second passage 19. Therefore, the powdered material is radially compressed and constricted at the constricting passage 21. However, the compression of the powder material is not completed. This is because the punch 47 is regulated so that it does not reach the constricting passage 21 when fully lowered, and the upper portion of the powdered material is left in the constricting passage 21. As a result of the above construction, the powdered material is transformed into a semicompacted form, that is, a product which is only partially compressed. The temporary foundation A is removed from the accommodation chamber 23 thorough the the side opening 39 of the die holder 29 and the aperture 25 of the die block 11.

Next, extrusion of the powdered material is carried out by repeating the charge of the powdered material and pressing the charged powder. Specifically, referring again to FIG. 1, a predetermined amount of the powdered material, which corresponds to the portion B of FIG. 1 at this step, is charged into the die cavity 15, while holding the punch assembly 5 at the preset highest position axially above the die assembly 3. Then, the punch assembly 5 is lowered and pushed into the die cavity 15 in a manner similar to the pressing operation of the preparatory step. The powder material B is pressed into the constricting passage 21 and the second passage 19, and incompletely compressed to form a new semicompacted portion which corresponds to the portion B in the right half of FIG. 2. At the same time, the former semicompacted portion, which at this step corresponds to the portions A of FIGS. 1 and 2, is completely compressed through the constricting passage 21 and extruded out of the die cavity 15 to form a complete pellet. The punch 47 is stopped at the lowest position by the stopper ring 51 abutting the container 7, and the tip of the punch 47 is disposed in the vicinity of the border between the container 7 and the die 9 above the constricting passage 21.

Then, by lifting and releasing the punch 47 from the die cavity 15, a bore at the bottom of the upper surface S1 of the semicompacted material B is again opened into the first passage 17 of the die cavity 15. The completed pellet A is removed from the die block 11 through the aperture 25 and the side opening 39. After that, by repeating the steps of charging the powdered material and pressing the powdered material into the constricting passage 21 of the die cavity 15 using the punch 47, pellets can be successively formed from the powder material.

In the extrusion operation according to the present invention, the obtained cylindrical pellet 59 has a diameter R1 which is approximately same as the diameter r2 of the second passage 19 of the die cavity 15, though the volume of the constricted powdered material is slight and radially expands at the outlet of the second passage 19 due to a spring-back force of the compressed powdered material. Moreover, since the powdered material is mainly compressed radially at the constricting passage 21 of the die cavity 15, a reduced volume of the powder material when it is pressed by the punch 47 changes in accordance with the ratio of the diameter of the inlet of the constricting passage 21 to that of the outlet 59, or the ratio of the diameter r1 of the first passage 17 to the diameter r2 of the second passage 19. In other words, the compression ratio can be changed in accordance with the constriction ratio at the constricting passage 21. Therefore, configuration of the die cavity 15 can be designed taking the bulk density of the powdered material and the desired density of the manufactured pellet into consideration, so that the second passage 19 has substantially the same diameter as that of a desired pellet, and so that the constricting passage 21 of the die cavity 15 has a suitable constriction ratio for the desired density. Here, it should be noted that, if an iron powder or an iron-containing mixed powder with a bulk density of about 3 g/cm$^3$ is used as the raw material, for example, the object density of the compressed pellet is preferably about 7.5 g/cm$^3$ or less, and a compression ratio of such a degree is preferable in the present invention. If the compression ratio exceeds the preferred range, the powder cannot be compressed sufficiently to the object value. The length of the pellet can be controlled by changing the amount of the powder material charged into the die cavity 15 at one time.

As a result of the above construction of the present invention, a powdered material can be easily compressed to form a cylindrical pellet with the desired density by using an ordinary compression die with only a few changes in the design of the die cavity 15.

The first embodiment of the present invention can be used for manufacturing not only a cylindrical pellet but also a pellet of polygonal cylindrical shape such as a tetragonal cylinder, a hexagonal cylinder, an oval cylinder and the like by modification of the shape of the die cavity 15 to the corresponding desired shape.

Figure 4:
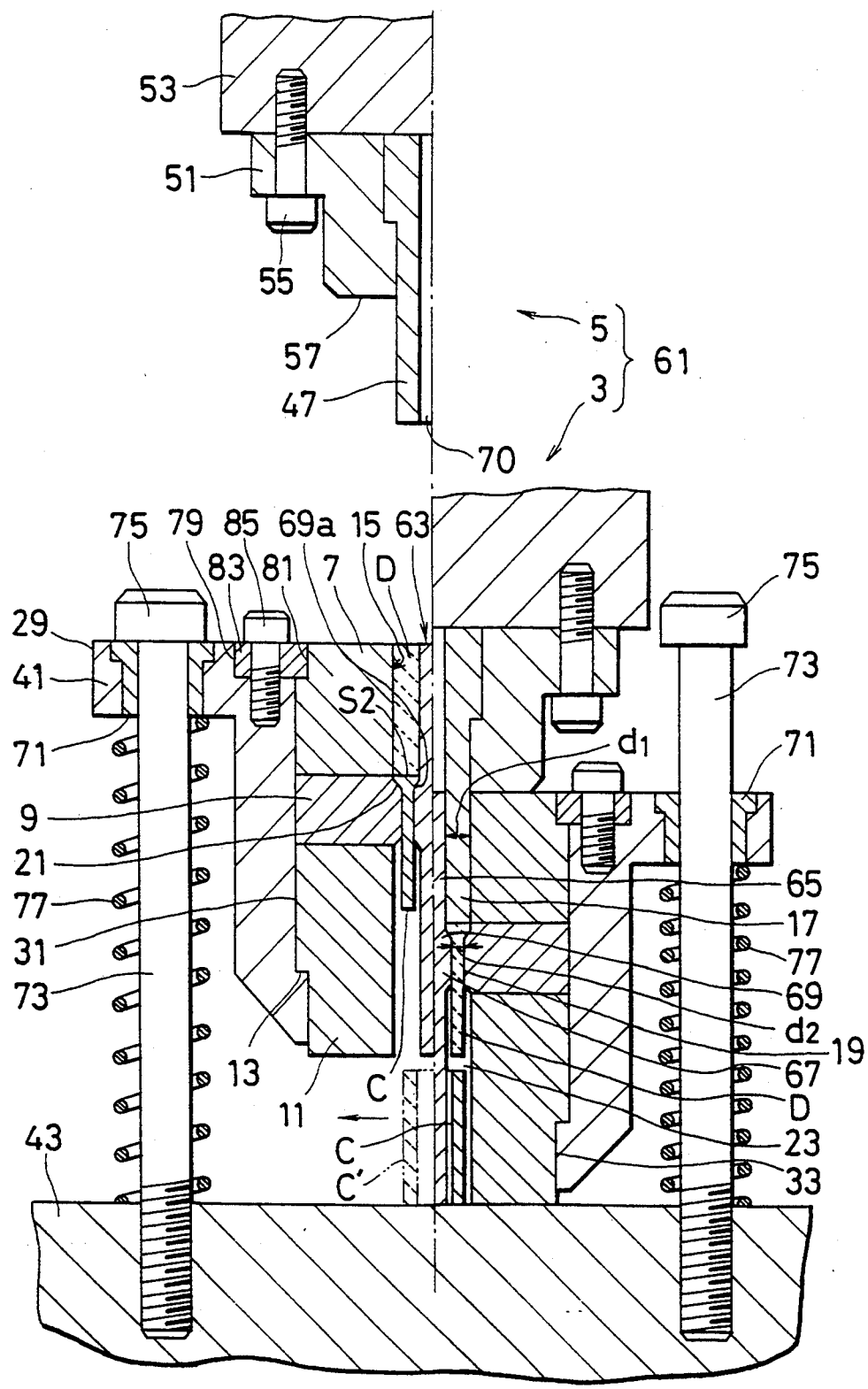
FIG. 4 is a vertical sectional view of the left and right portions of a second embodiment of the extrusion apparatus according to the present invention for explaining the operation of the apparatus.
Figure 5:
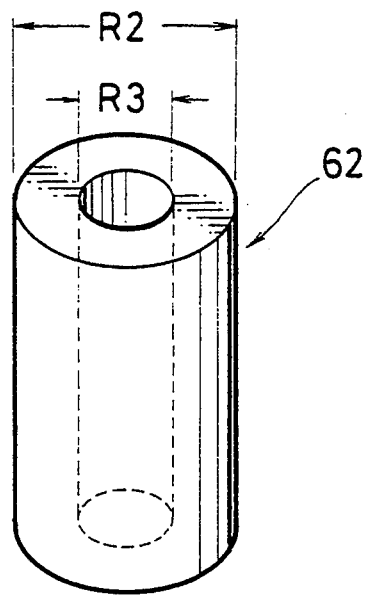
FIG. 5 is a perspective view of a pellet manufactured by the apparatus of FIG. 4.

Next, FIG. 4 shows a second embodiment of the extrusion apparatus 61 according to the present invention. This apparatus is modified to manufacture a pellet 62 with a tubular shape as shown in FIG. 5. Moreover, this apparatus further includes an improvement by which the manufactured pellet can be more easily removed from the die assembly. In FIG. 4, the left half shows the step of charging the powdered material, and the right half shows the completed step of pressing the powdered material.

The extruding apparatus 61 is characterized by further comprising a mandrel 63 which is disposed at the center of the die cavity 15. The mandrel 63 has the same length as the total of the lengths of the container 7, die 9, and die block 11, and includes three portions, cylindrical first and second portions 65 and 67 and a constricting portion 69. The diameter of the first portion 65 is smaller than that of the second portion 67, and the constricting portion 69 formed into a truncated-cone shape is interposed between the first and second portions 64 and 67 with an inclined surface 69a having approximately the same inclination as that of the inclined surface 21a of the die 9 at the constricting passage 21 so that the constricting portion 69 of the mandrel 63 and the constricting passage 21 of the die 9 are located side by side. Centered in the die cavity 15, the mandrel 63 forms a tubular cavity comprising a first tubular passage 17 in which the radial width d1 is larger than that of the object pellet 62 and a second tubular passage 19 in which the radial width d2 is substantially the same as that of the object pellet 62. The mandrel 63 is thinner at the lower portion thereof, and the cavity is further enlarged to form a tubular accommodation chamber 23.

According to the above configuration, the punch 47 is formed in a tubular shape with an inner bore 70 of the same diameter as that of the first portion 65 of the mandrel 63 in order to receive the first portion 65 when the punch 47 is pressed into the die cavity 15. The other parts of the punch assembly 5 are structured in a similar manner to those in the first embodiment, respectively.

In this embodiment, a step portion 13 is formed at the lower outer periphery of the die block, and a rim portion 33 is formed at the bottom portion of the die holder 29 so that the container 7, the die 9, and the die block 11 are inserted from the upper side of the die holder 29. Moreover, the flange 41 is formed on the upper portion of the die holder 29, and a plurality of bushing 71 are arranged on the flange 41. Guide rods 73 of the same number as that of the bushes vertically stand on the lower hard plate 43, and each of the guide rods 73 passes through one of the bushings, respectively so that the die holder 29 can vertically move in the longitudinal direction of the die cavity 15. Each of the guide rods 73 has a head portion 75 at the tip thereof around which a spring 77 is provided disposed between the lower hard plate 43 and the head portion 75 of the guide rod 73 to elastically activate the flange 41 in the upward direction against the head portion 75 and support the die holder 29. In addition, a circumferential recess 79 is formed on the upper end portion of the inner bore 31 of the die holder 29, and a circumferential step 81 is formed on the outer periphery of the upper portion of the container 7. A ring 83 is received in the recess 79 and the step 81 and fastened to the die holder 29 by bolts 85 s0 that the container 7, the die 9 and the die block 11 are firmly secured in the die holder 29.

The operation of the extrusion apparatus of the second embodiment will be described below.

First, with the mandrel 63 supported in the die cavity 15 and positioned coaxially with the die cavity 15, material for the temporary foundation is placed in the die cavity 15, closing the constricting passage 21 with the temporary foundation. In this embodiment, an annular pellet having the same radial sectional shape as that of the second passage 19 may be used as well for the temporary foundation.

After the above-described preparation of the temporary foundation which corresponds to the portions C in both half portions of FIG. 4, the die cavity 15 is charged with a predetermined amount of the powdered material, which corresponds to the portions D in both half portions of FIG. 4, and the charged powdered material is pressed by the punch 47 into the die cavity 15 against the temporary foundation C. In this operation, the die holder 29 is pushed against the springs 77 and abuts on the lower hard plate 43 as shown in the right half portion of FIG. 4. The temporary foundation C is then extruded from the die cavity 15 through the constricting passage 21 and the second passage 19 to enter the accommodation chamber 23. At the same time, the powdered material is pressed into the constricting passage 21 and the second passage 19.

At this time, the pressure vertically applied to the powdered material by the punch 47 produces reaction forces on the inclined surface 21a of the die 21 and the inclined surface 69a of the constricting portion 69. The powdered material in the vicinity of the inclined surface 21a is radially pressed inward, and the powder in the vicinity of the surface 69a is radially pressed outward.

As a result, the powdered material is radially concentrated, while being pushed downward into the second passage 19. Therefore, the powdered material is radially compressed and constricted at the constricting passage 21 to form a tubular semicompacted section.

Next, referring again to the left half portion of FIG. 4, the punch 47 is elevated, and the die holder 29 is pushed by the spring 77 to slide on the guide rods 73 and return to the original upper position, while holding the mandrel 63 and the semicompacted section in the die cavity 15. At this time, since the temporary foundation, which corresponds to the portion C' in the left half portion of FIG. 4 at this step, is left on the lower hard plate 43 under the die holder 29, therefore, the temporary foundation can be quickly removed by pushing it away using a bar or the like. A bore at the bottom of the upper surface S2 of the semicompacted section which corresponds to the portion C at this step is opened in the first passage 17 of the die cavity 15.

Then, a predetermined amount of the powdered material, which corresponds to the portion D in the left half portion of FIG. 4 at this step, is charged into the die cavity 15. The punch assembly 5 is again lowered and pushed into the die cavity 15 in a manner similar to the pressing operation in the preparatory step. The powder material D is pressed into the constricting passage 21 and the second passage 19, and incompletely compressed to form a new semicompacted section which corresponds to the portion D in the right half portion of FIG. 4. At the same time, the former semicompacted section, which at this step corresponds to the portions C in both half portions of FIG. 4, is completely compressed through the constricting passage 21 and extruded from the die cavity 15 to form a completed pellet. The punch 47 is stopped at the lowest position by the stopper ring 51 abutting the container 7, and the tip of the punch 47 is positioned in the vicinity of the border between the container 7 and the die 9 above the constricting passage 21.

Referring again to the left half portion of FIG. 4, by lifting and releasing the punch 47 from the die cavity 15, a bore at the bottom of the upper surface S2 of the semicompacted material C, is again opened in the first passage 17 of the die cavity 15. On the other hand, the completed pellet which corresponds to the portion C' in the left half portion of FIG. 4 is removed from the die assembly 3 in the same manner.

By repeating the steps of charging the powdered material and pressing the powdered material into the constricting passage 21 of the die cavity 15 using the punch 47, the powdered material can be successively compressed to form a tubular pellet.

In the second embodiment, the resulting tubular pellet 62 has an outer diameter R2 and an inner diameter R3, wherein the outer diameter R2 is approximately the same as that of the second passage 19, and the inner diameter R3 is approximately the same as that of the second portion of the mandrel 63, though the volume of the constricted powdered material is less and radially expands at the outlet of the second passage 19 from the spring-back force of the compressed powdered material. The reduced volume of the powdered material when it is pressed by the punch 47 changes in accordance with the ratio of the radial width of the inlet of the constricting passage 21 to that of the outlet 59, or the ratio of the radial width d1 of the first passage 17 to the diameter size d2 of the second passage 19. That is, the compression ratio can be changed in accordance with the constriction ratio at the constricting passage 21. Therefore, configuration of the die cavity 15 and the mandrel 63 is designed taking the bulk density of the powdered material and the desired density of the manufactured pellet into consideration, so that the second passage 19 has substantially the same cross-sectional shape as the desired pellet, and so that the constricting passage 21 of the die cavity 15 has a suitable constriction ratio for the desired density.

Here, an example of the structure of the constricting portion used for the above-described embodiments will be illustrated.

When a mixed powder mainly containing iron element is used as a raw material in the above-described embodiments, the inclination angle $\theta$ of the inclined surface 21a relative to the longitudinal-direction of the die cavity is preferably selected within a range of less than or equal to 20°, more preferably, in the vicinity of 10°. If the inclination angle $\theta$ exceeds the above-described range, a pressure necessary for extrusion increases. In a case of using a powdered material containing copper element or aluminum element is used, the inclination angle may be set larger than the above-described range for iron-containing powder.

Moreover, when an area reduction ratio AR (%) is defined by the expression, $AR=(S-S')\times 100/S$, wherein S is a sectional area of the first passage, and S' is a sectional area of the second passage, the area reduction ratio AR is preferably within a range of about 10% to about 15%. For example, when the raw powdered material to be used is an iron-containing powder and the area reduction ratio AR is about 13%, the obtained pellet has a density of about 7.1 g/cm$^3$, though the result may somewhat changes in accordance with the operating speed of the punch. If the area reduction ratio exceeds 20%, the extrusion operation becomes difficult.

The above-described second embodiment of the present invention can be used for manufacturing not only a pellet shaped as a circular tube, but also a pellet with an outer periphery and an inner diameter either of which forms a polygonal cylinder such as a tetragonal cylinder, a hexagonal cylinder, an oval cylinder and the like by modification of the die cavity 15 and the mandrel 63 to the corresponding desired shapes.

Figure 7:
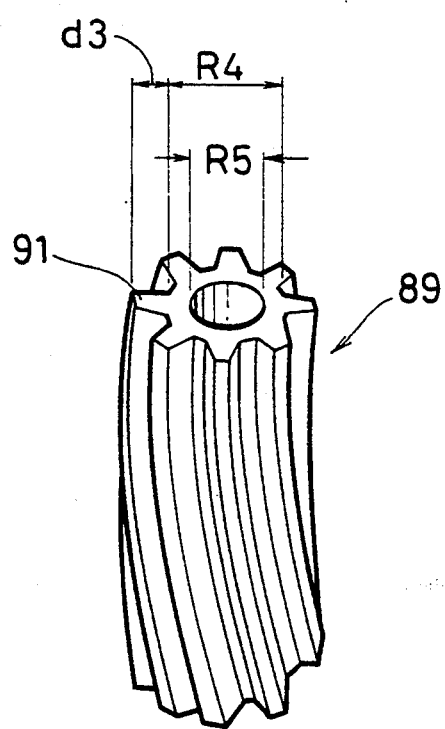
FIG. 7 is a perspective view of a pellet manufactured by the apparatus of FIG. 6.
Figure 6:
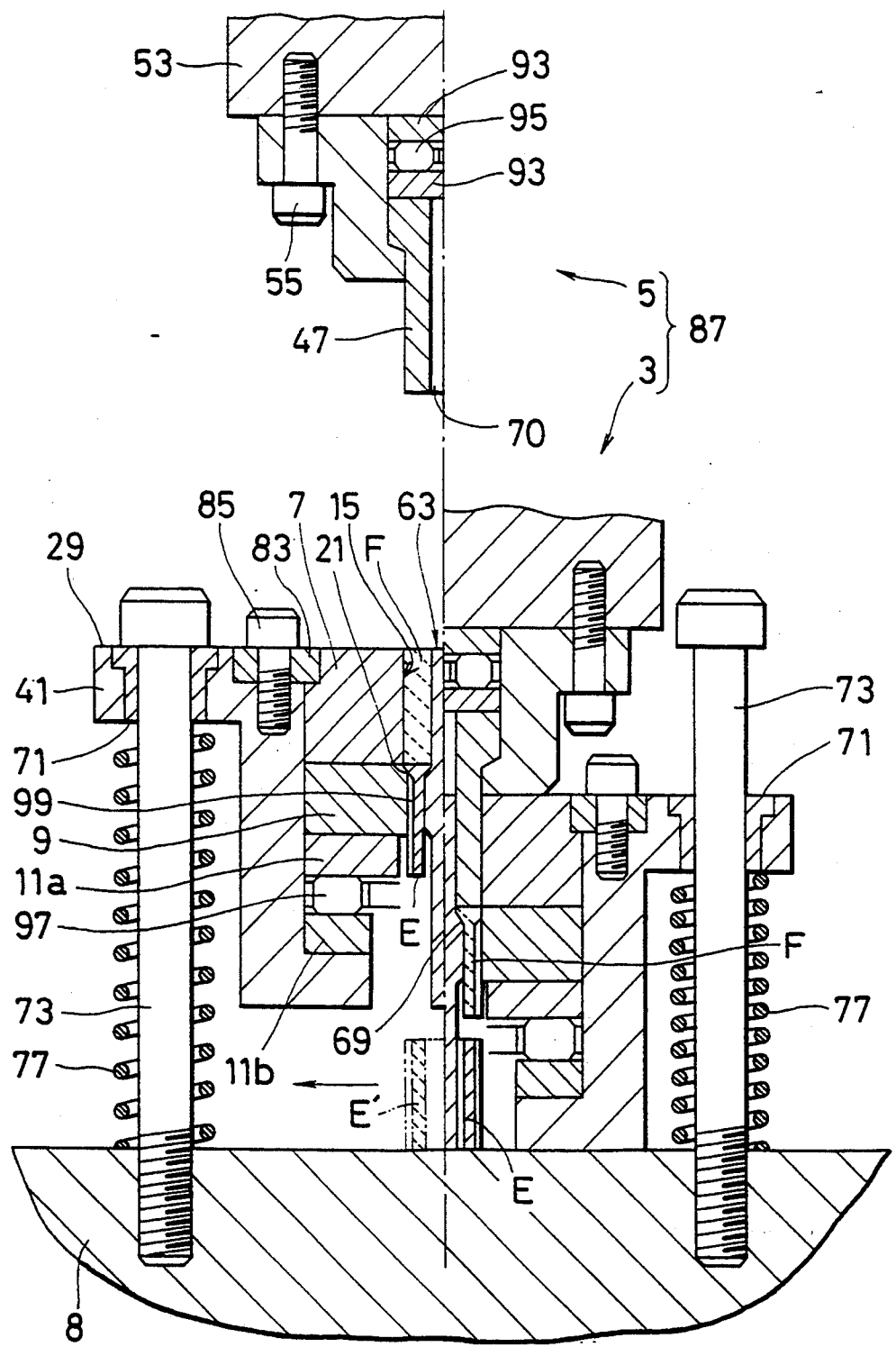
FIG. 6 is a vertical sectional view of the left and right portions of a third embodiment of the extrusion apparatus according to the present invention for explaining the operation of the apparatus.

FIG. 6 shows a third embodiment of the extrusion apparatus 87 according to the present invention. In this apparatus 87, the apparatus 61 of the second embodiment is further modified to manufacture a tubular pellet 62 with a helical gear 91 on the cylindrical outer periphery thereof, as shown in FIG. 7. Moreover, to accomplish the above easier, this apparatus additionally includes mechanisms for rotatably supporting the punch 47 on the upper hard plate 53 and for rotatably supporting the die 9 relative to the die holder 29. In FIG. 6, the left half shows the step of charging the powdered material, and the right half shows the step where the pressing of the powder material has been finished.

In detail, the punch 47 is mounted on the upper hard plate 53 via a pair of bearings 93 between which a roller bearing 95 is interposed. In the die assembly 3, the die block 11 is separated into an upper block 11a and a lower block 11b, and roller bearings 97 are disposed between the upper and lower blocks 11a and 11b.

The mandrel 63 has the same structure as that of the second embodiment, because the shape of the inner bore of the object pellet 89 is the same as that of the pellet 62 which is manufactured by the second embodiment.

On the other hand, the constricting passage 21 and the second passage 19 of the die cavity 15 are provided with helical recesses 99 so that the shape of the second passage 19 is substantially identical to the outer surface of the object pellet 89 with the helical gear 91. From the second passage 19, the helical recesses 99 extend upward to the inclined surface 21a and gradually enlarged in the inclined surface 21a so that the lateral section of the constricting passage 21 has a shape similar to that of the object pellet 89. In other words, along the extruding direction, also the width and depth of the helical recesses 99 are correspondingly decreases in accordance with the constriction of the die cavity.

The operation of the extruding apparatus 87 of the third embodiment with the above construction will be described below.

First, with the mandrel 63 supported in the die cavity 15 coaxially with the die cavity 15, a material for the temporary foundation is placed in the die cavity 15 in a similar manner to that in the second embodiment to close the constricting passage 21 with the temporary foundation which corresponds to the portion E in the left half of FIG. 6.

Next, the die cavity 15 is charged with a predetermined amount of the powdered material, which corresponds to the portions F in both halves of FIG. 6, and the charged powder material is pressed by the punch 47 into the die cavity 15 against the temporary foundation C. In this operation, the die holder 29 is pushed against the spring 77 and abuts on the lower hard plate 43 as shown in the right half of FIG. 6. The temporary foundation C is then extruded from the die cavity 15 through the constricting passage 21 and the second passage 19 to enter the accommodation chamber 23. At this time, the punch 47, die 9, and the upper block 11a are rotated relative to the die holder 29, while the powdered material is pressed into the constricting passage 21 and the second passage 19.

At this time, the pressure vertically applied to the powdered material by the punch 47 produces reaction forces on the inclined surface 21a of the die 21 and the inclined surface 69a of the constricting portion 69, forming the helical gear with the helical recesses 99. The powdered material is similarly pressed from both the outer side and inner side radially, radially compressed, and pushed downward into the second passage 19 to form a semicompacted section of a tubular shape with spirals. The die 21 and the punch 47 rotate due to the pressure applied to the helical recesses 99.

Next, referring again to the left half of FIG. 6, the punch 47 is elevated, and the die holder 29 is pushed by the spring 77 to slide on the guide rods 73 and return to the original upper position, while holding the mandrel 63 and the semicompacted material in the die cavity 15. The temporary foundation, which corresponds to the portion E' in the left half of FIG. 4 at this step, remains on the lower hard plate 43 under the die holder 29, and is quickly removed by pushing it away using a bar or the like.

Then, a predetermined amount of the powdered material, which corresponds to the portion F in the left half of FIG. 6 at this step, is charged into the die cavity 15. The punch assembly 5 is again lowered and pushed into the die cavity 15 in a manner similar to the pressing operation in the preparatory step. The powdered material F is pressed into the constricting passage 21 and the second passage 19, and incompletely compressed to form a new semicompacted section which corresponds to the portion F in the right half of FIG. 4. At the same time, the former semicompacted section, which at this step corresponds to the portions E in both halves of FIG. 4, is completely compressed through the constricting passage 21 and extruded from the die cavity 15 to foam a completed pellet.

Referring again to the left half of FIG. 6, by lifting and releasing the punch 47 from the die cavity 15, the completed pellet which corresponds to the portion E' in the left half of FIG. 4 is removed from the die assembly 3 in a similar manner.

By similarly repeating the steps of charging the powdered material and pressing the powdered material into the constricting passage 21, the powdered material can be successively compressed to form a tubular pellet with spirals.

In the third embodiment, the cylindrical portion of the obtained pellet 89 has an outer diameter R4 and an inner diameter R5, wherein the outer diameter R2 is approximately the same as that of the second passage 19, and the inner diameter R3 is approximately the same as that of the second portion of the mandrel 63. Then, the lateral width d3 of the helical gear 91 is approximately the same as the depth of the helical recess formed in the second passage. Of course, the compression ratio can be changed in accordance with the constriction ratio at the constricting passage 21, and therefore, the configuration of the die cavity 15 and the mandrel 63 is designed so that the second passage 19 has substantially the same cross-sectional shape as a desired pellet, and so that the constricting passage 21 of the die cavity 15 has a suitable constriction ratio for the desired density.

In the above-described construction of the third embodiment, the mechanisms for rotatably supporting the punch and the die operate to reduce resistance between the powder material and the die cavity which has a rather complicated shape, such as the helical gear mentioned above, to smoothly perform the compression operation.

In regard to the helical recesses 99 of the above-described third embodiment, the portions extending in the inclined surface 21a of the constricting passage 21 can be omitted as occasion arises. In this case, the corners formed between the inclined surface 21a and the helical recesses may be chamfered to smoothly pour the powdered material into the helical recesses. In another example, the depth of each of the helical recesses in the inclined surface 21a can be gradually reduced along the direction contrary to the extruding direction. In this case, in return for the above reduction of the depth, the width of the helical recess is circumferentially enlarged more widely than that of the third embodiment described above along the direction contrary to the extruding direction in order to retain the lateral sectional area. By this structure, the powdered material can be smoothly poured from the first passage into the constricting passage in the vicinity of the connecting portion therebetween.

The above-described third embodiment of the present invention can be used for manufacturing not only a pellet with an outer helical gear, but also that having an inner spiral provided on the inner bore by modification of the mandrel 63 so that a spiraled recess is formed on the second portion 67 and the constricting portion 69.

As clearly understood from the above description, the extrusion method according to the present invention can be performed by using an ordinary extrusion die, and accomplishes a simple compression operation applicable to various longitudinal shapes. Moreover, the present invention is suitable for successive manufacturing of pellets. In addition, the compression ratio can be easily controlled by designing the die cavity and mandrel in the manner explained in the above description.

In the above-described embodiments, it is possible to change the length of the second passage. If the object pellet has no spiral portion, the second passage may be omitted. However, it is preferred for retaining mechanical strength of the die at the portion forming the constricting passage and the outlet thereof to provide an appropriate length of the second passage on the die cavity.

The extrusion method of the present invention is suitable for compressing a metal powder in order to form green pellets which are to be sintered into mechanical parts. However, this method is not limited to the above application, but can also be utilized for compressing other powdered materials in various fields.

As mentioned above, it must be understood that the invention is in no way limited to the above embodiments and that many changes may be brought about therein without departing from the scope of the invention as defined by the appended claims.

What is claimed is:

1. A method of extruding a powdered material to form a discrete pellet composed of the powdered material, comprising the steps of:
   (A) preparing a semicompacted powdered material for temporary placement in a die cavity with a constricting passage for receiving a charge of the powdered material, wherein the constricting passage is tapered at an angle of approximately 10° with respect to a longitudinal axis of the die cavity;
   (B) charging the die cavity containing the semicompacted powdered material with a predetermined amount of the powdered material;
   (C) pressing the charged powdered material into the die cavity against the semicompacted material and extruding all of the semicompacted material from the die cavity through the constricting passage by a single stroke of a punch press, whereby all of the semicompacted material is completely compressed to form a discrete pellet of compacted powdered material by means of pressure which is radially exerted at the constricting passage with respect to the longitudinal axis as a reaction force in response to pressing of the charged powdered material, and the charged powdered material is incompletely compressed into a semicompacted form; and
   (D) repeating the steps (B) and (C) to successively form the powdered material into discrete pellets via the semicompacted material.

2. The extruding method of claim 1, wherein the preparing step (A) includes the steps of:
   (a) placing a temporary foundation in the die cavity so that the temporary foundation can temporarily receive the powdered material into the die cavity;
   (b) charging the die cavity with a predetermined amount of the powdered material; and
   (c) pressing the charged powdered material into the die cavity against the temporary foundation and extruding the temporary foundation from the die cavity through the constricting passage, whereby the charged powdered material is incompletely compressed and formed into the semicompacted powdered material.

3. The extruding method of claim 2, wherein the temporary foundation of the preparing step (A) includes a piece composed of deformable material.

4. The extruding method of claim 3, wherein the deformable material is selected from soft metals, rubbers, cellular materials, paper, cloth and fibrous filler.

5. The extruding method of claim 1, wherein the cross-sectional dimension of the die cavity is gradually reduced at the constricting passage to a size that is approximately as large as the cross-sectional dimension of the pellet.

6. The extruding method of claim 1, wherein the formed pellet has an axially elongated shape.

7. The extruding method of claim 1, further comprising, before the preparing step (A), the step of:
   placing a mandrel in the die cavity for defining the die cavity in a tubular shape.

8. The extruding method of claim 1, wherein the die cavity further includes forming means provided on the constricting passage for forming a spiral shaped portion on the pellet.

9. The extruding method of claim 1, wherein a lateral sectional dimension at the constricting passage is reduced 10 to 15% from an inlet end to an outlet end by an area reduction ratio AR, AR being defined by the following equation:

$$AR = (S - S') \times 100/S$$

wherein S is a sectional area of the inlet end of the constricting passage, and S' is a sectional area of the outlet end of the constricting passage.

10. The extruding method of claim 1, wherein the outlet sectional area S' is approximately as large as a lateral sectional dimension of the desired pellet.

11. The extruding method of claim 1, wherein the constricting passage is defined by a truncated conical surface.

12. The extruding method of claim 1, wherein the powdered material is an iron-containing powder having a bulk density of approximately 3 g/cm$^3$, and the powdered material is formed into a pellet having a density of approximately 7.5 g/cm$^3$ through the steps (A) to (D).

* * * * *

UNITED STATES PATENT AND TRADEMARK OFFICE
CERTIFICATE OF CORRECTION

PATENT NO. : 5,409,662
DATED : April 25, 1995
INVENTOR(S) :
    Yoshiki HIRAI

It is certified that error appears in the above-indentified patent and that said Letters Patent is hereby corrected as shown below:

On the cover, in section [56], "References Cited", "U.S. PATENT DOCUMENTS", insert ---3,833,697  9/1974  Lare et al. .........264/60---.

On the cover, in section [56], "References Cited", "FOREIGN PATENT DOCUMENTS", insert ---2524412  12/1976  Germany---.

On the cover, in section [56], "References Cited", "FOREIGN PATENT DOCUMENTS", insert ---3636798  4/1988  Germany---.

On the cover, in section [56], "References Cited", "FOREIGN PATENT DOCUMENTS", insert ---2508065  9/1976  Germany---.

On the cover, in section [56], "References Cited", "OTHER PUBLICATIONS", insert ---DIN 30900, ed. July 1982, p.7.---.

On the cover, in section [56], "References Cited", "OTHER PUBLICATIONS", insert ---"ABC Technik und Naturwissenschaft," vol.2, 1970, pages 737, 1029.---.

UNITED STATES PATENT AND TRADEMARK OFFICE
CERTIFICATE OF CORRECTION

PATENT NO. : 5,409,662
DATED : April 25, 1995
INVENTOR(S) : Yoshiki HIRAI

It is certified that error appears in the above-indentified patent and that said Letters Patent is hereby corrected as shown below:

On the cover, in section [56], "References Cited", "OTHER PUBLICATIONS", insert ---F. EISENKOLB, "Fortschritte der Pulvermetallurgie," vol. I, 1963, pp. 317, 318.---.

On the cover, in section [56], "References Cited", "OTHER PUBLICATIONS", insert ---"Aluminum," Vol.50, May 1974, pp. 343-349.---.

On the cover, in section [56], "References Cited", "OTHER PUBLICATIONS", insert ---German Office Action and English Language Translation thereof dated 16 February 1994.---.

At column 8, line 33, change "s0" to ---so---.

At column 10, line 64, change "11aand" to ---11a and ---.

Signed and Sealed this

Twenty-fourth Day of December, 1996

Attest:

BRUCE LEHMAN

*Attesting Officer*　　　*Commissioner of Patents and Trademarks*